(12) United States Patent
Underbakke

(10) Patent No.: US 8,882,446 B2
(45) Date of Patent: Nov. 11, 2014

(54) BEARING SYSTEM FOR ROTOR IN ROTATING MACHINES

(75) Inventor: Harald Underbakke, Sandnes (NO)

(73) Assignee: Statoil Petroleum AS (NO)

( * ) Notice: Subject to any disclaimer, the term of this patent is extended or adjusted under 35 U.S.C. 154(b) by 1039 days.

(21) Appl. No.: 12/864,613

(22) PCT Filed: Jan. 29, 2009

(86) PCT No.: PCT/NO2009/000034
§ 371 (c)(1),
(2), (4) Date: Nov. 16, 2010

(87) PCT Pub. No.: WO2009/099334
PCT Pub. Date: Aug. 13, 2009

(65) Prior Publication Data
US 2011/0052375 A1    Mar. 3, 2011

(30) Foreign Application Priority Data

Feb. 7, 2008 (NO) .................................. 20080700

(51) Int. Cl.
| | | |
|---|---|---|
| *F04D 29/057* | (2006.01) | |
| *F04D 29/058* | (2006.01) | |
| *F04D 29/047* | (2006.01) | |
| *F04D 29/10* | (2006.01) | |
| *F16C 17/02* | (2006.01) | |
| *F16C 32/06* | (2006.01) | |
| *F16C 33/72* | (2006.01) | |

(52) U.S. Cl.
CPC ............ *F04D 29/047* (2013.01); *F04D 29/057* (2013.01); *F04D 29/102* (2013.01); *F04D 29/106* (2013.01); *F16C 17/02* (2013.01); *F16C 32/0692* (2013.01); *F16C 33/72* (2013.01)

USPC .......... 415/111; 415/112; 415/229; 415/230; 415/231; 415/174.1; 415/174.2; 416/174; 384/100; 384/107; 384/114; 384/119

(58) Field of Classification Search
USPC .............. 415/229, 230, 231, 173.7, 111–113, 415/174.1, 174.2; 384/100, 107, 114, 119; 310/90.5; 416/174
See application file for complete search history.

(56) References Cited

U.S. PATENT DOCUMENTS

| | | | | |
|---|---|---|---|---|
| 5,059,845 | A | * | 10/1991 | Wilson ......................... 310/90.5 |
| 5,310,265 | A | | 5/1994 | Stangeland et al. |
| 5,516,212 | A | * | 5/1996 | Titcomb ........................ 384/107 |
| 5,827,042 | A | | 10/1998 | Ramsay |
| 6,210,103 | B1 | * | 4/2001 | Ramsay ......................... 415/112 |
| 7,731,476 | B2 | * | 6/2010 | Ganelin et al. ................ 415/104 |

FOREIGN PATENT DOCUMENTS

| | | | |
|---|---|---|---|
| EP | 1607633 | A1 | 12/2005 |
| EP | 1619355 | A1 | 1/2006 |
| WO | 9713084 | A1 | 4/1997 |
| WO | 2008018800 | A1 | 2/2008 |

* cited by examiner

*Primary Examiner* — Christopher Verdier
(74) *Attorney, Agent, or Firm* — Volpe and Koenig, P.C.

(57) ABSTRACT

A bearing system for a rotor in rotating machines, such as compressors, pumps, turbines, expanders, has points of bearing and sealing for the rotor each being in the form of a combined bearing and sealing formed by a stator situated within a rotating machine house and surrounding the rotor. The stator is formed with a bore, whereby an annular clearance is created between stator and rotor, and the bore is having sectional area gradually increasing in the direction of larger pressure within the rotating machine.

15 Claims, 10 Drawing Sheets

P2 > P1
K: positive direct rigidity
C: positive direct damping

P2 > P1

K: positive direct rigidity

C: positive direct damping

US 8,882,446 B2

BEARING SYSTEM FOR ROTOR IN ROTATING MACHINES

FIELD OF INVENTION

The present invention relates to a bearing system for a rotor in rotating machines, as specified in the preamble of patent claim 1.

BACKGROUND

In existing rotating machines, the rotor is supported both axially and radially. This may be done using bearings which are lubricated, magnetic, gas-dynamic etc. A common feature of all these bearings is that the length of the rotor shaft increases. Complex and costly support systems are also a necessity, except in the case of gas-dynamic bearings. Gas-dynamic bearings of the foil type do not require such support systems, but their bearing strength is for the present far less than that required for rotating machines with high output or pressure.

Other hydrodynamic and hydrostatic gas bearings have been proposed and to some extent tested but have not achieved significant popularity. Typical for hydrodynamic bearings, for example a foil bearing, is that their rotation generates a lift which gives bearing strength. In hydrostatic bearings, external pressurisation is carried out using specially formed recesses in the bearings. This bearing type requires separate seals.

Some examples of such bearings are disclosed by EP-A1 1607633, 1619355, U.S. Pat. No. 5,827,042 and WO-A1 97/13084.

Amongst these, EP-A1 1607633 describes a vacuum pump having two screw rotors which are supported by a pair of bearings installed on a pair of shafts. The invention is distinguished by a pair of shaft seals not being in contact with the pair of shafts are mounted between the screw rotors and pair of bearings.

EP-A1 1619355 relates to a steam turbine rotor which is rotatably supported in the longitudinal direction, hi this instance, turbine components provide for chambers being formed around the rotor and are exposed to an inner and outer pressure which are different. The turbine has at least one water-powered shaft bearing component to accommodate the rotor, whereby this component along with the turbine component are sealed one after the another in the longitudinal direction.

U.S. Pat. No. 5,827,042 shows a stuffing box for a centrifugal pump, where a spiral groove is cut on the outer surface of a pair tapered bearing surfaces for the rotor. Barrier-liquid is feed to an entry-mouth in the spiral groove, and the groove generates a pressure in the spiral groove which is high enough to overcome the process pressure.

At last, WO-A1 97/13084 discloses an impeller pump, in which the sealing and bearing unit has two rotor-stator pairs of tapered sleeves having a spiral groove which conveys barrier-liquid from an entry-mouth in an entry-chamber to an exit-mouth in an exit-chamber, providing the unit with mechanical stability, trust support capability, and resistance to vibrations in the unit.

This means that the existing technology provides solutions which are costly, complex, bulky and not particularly reliable.

SUMMARY

The main object of the present invention is therefore to provide an improved bearing system for the rotor in rotating machines, with combined bearing and sealing of the rotor.

This object is achieved by the bearing system disclosed in patent claim 1. Preferred embodiments of the invention will be understood from the dependent claims and the following description of preferred embodiments.

Among the advantages of such a combined bearing system are that the design may be compact, allowing the rotor to be made shorter and more rigid for enhanced rotor-dynamic performance, or alternatively shorter and thinner for weight reduction, that the sealing aspect has much less importance than before, and that the costs are cut substantially as a result of the reliability or even the practicability of using the rotating machine in a subsea environment. The actual working medium in the machine may also be used during operation of the system so as to further reduce the complexity compared with known solutions.

By forming the bearing and seal combination according to the invention of an axial bearing in the form of a cylindrical disc on the rotor which rests against an associated portion of the stator, a gas film can be formed with rigidity and damping corresponding to the same principle as in a radial bearing with desired dynamic rigidity and damping. Alternatively, the axial bearing can be formed corresponding to the hydrostatic principle, which involves a flow restriction before and after the bearing surface, so as to obtain rigidity with accompanying damping. The axial bearing can also be formed using a combination of the two principles.

BRIEF DESCRIPTION OF THE DRAWINGS

The present invention will now be discussed in more detail with the aid of preferred illustrative embodiments shown in the drawings, in which.

DETAILED DESCRIPTION OF THE PREFERRED EMBODIMENT(S)

With reference to FIG. 1, the present invention shall be explained in more detail in connection with rotating machines, for example such as a compressor for use in subsea environments and which has a motor-powered rotor. However, this must not be understood as meaning that the invention relates solely to the illustrated compressor, as it is of course suitable other rotating machine types and environments of use. Furthermore, it should be noted that the figures only show details which are important for the understanding of the invention.

Figure 1A:
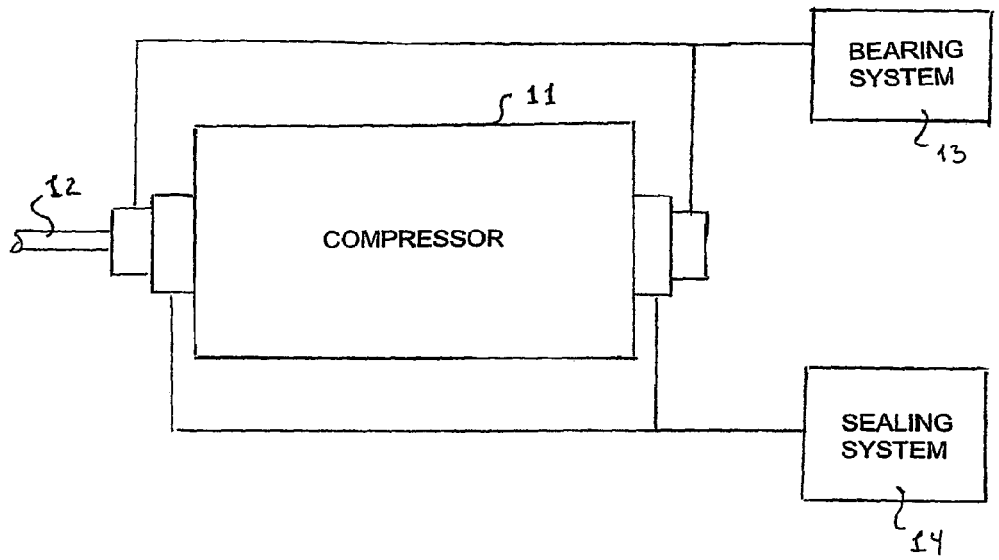
FIGS. 1A and 1B show schematically the difference between a traditional rotating machine in the form of a compressor with motor-powered rotor, and the corresponding formed in accordance with the invention.
Figure 1B:
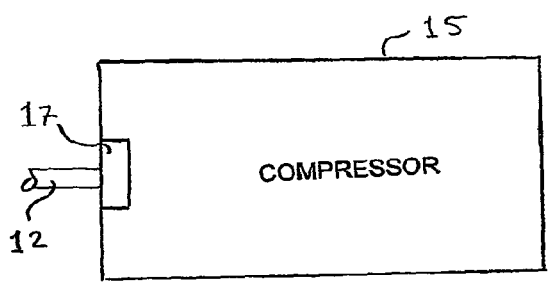

As shown in FIG. 1A, the traditional compressor has a motor-powered rotor, equipped with a bearing system 13 and a sealing system 14, respectively, which are placed on a rotor shaft 12 at each end outside a compressor housing 11. As illustrated in FIG. 1B, whereas these external bearing and sealing systems in the case of the present invention are replaced by at least two components 17, of which just one is shown, and which are located inside the compressor housing 15. The new component 17 also functions as a combination of a bearing and seal for the rotor 16, see FIG. 2. This means that the compressor can be equipped with a suitable motor, see FIG. 6, which is arranged inside the compressor housing. Thus, the need for external shaft seals no longer exists, with the result that the rotating machine as such has a far simpler design.

Figure 2:
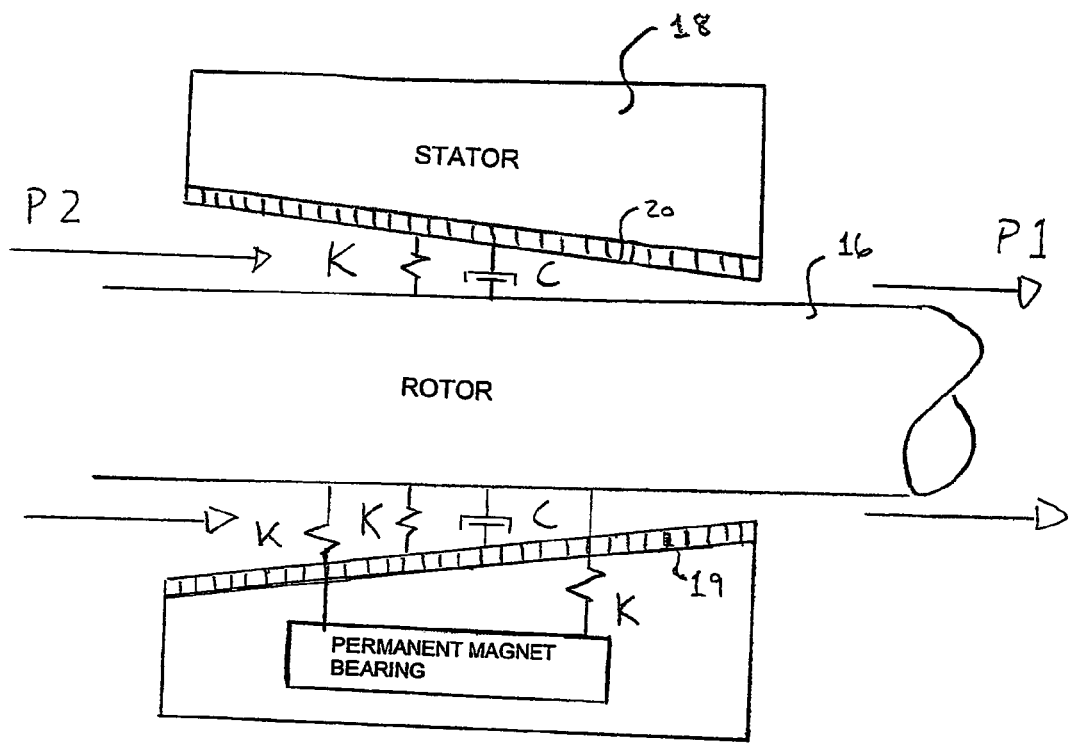
FIG. 2 shows in a schematic sectional view the basic structure of a component having combined bearing and seal which is included in the present bearing system.

The principle of the combined bearing and seal 17 from FIG. 1B is illustrated in greater detail in FIG. 2. According to the general embodiment of the invention, an approximately cylindrical stator 18, i.e., the stationary part surrounding the rotor 16, is formed with a bore 19, whereby an annular clearance is formed between these. The stator 18 thus constitutes a "bearing point" for the rotor 16. Furthermore, the pressure difference is used, i.e., the pressure drop across the clearance, to obtain the function as combined rotor bearing and seal. In FIG. 2 this is symbolised by means of P2 and Pl, that is to say the outlet pressure and the inlet pressure of the compressor, respectively. The precondition for a successful result is, however, that the annular clearance has a geometric configuration that gives sufficient rigidity and damping in the relevant frequency ranges, as symbolised by K and C in FIG. 2. The rigidity can be provided by allowing the annular clearance to converge towards the lower pressure, so that the inlet clearance is greater than the outlet clearance. Positive direct rigidity is thus obtained in the bearing. Positive direct damping may be provided by means of the characteristics of the surface 20 of the stator facing the rotor, e.g., by means of a honeycomb structure or other type of roughness in the surface. The stator 18 is, for example, mounted in a T-shaped groove (not shown) with loose fit in the compressor housing.

Positive direct rigidity is a known concept in the field of rotor dynamics and entails the countering of radial motion of the rotor by the bearing, so that the same holds the rotor centred in the clearance for correct positioning in relation to the stator. Direct positive damping means that the rotor is "braked" or damped by the bearing.

Figure 3:
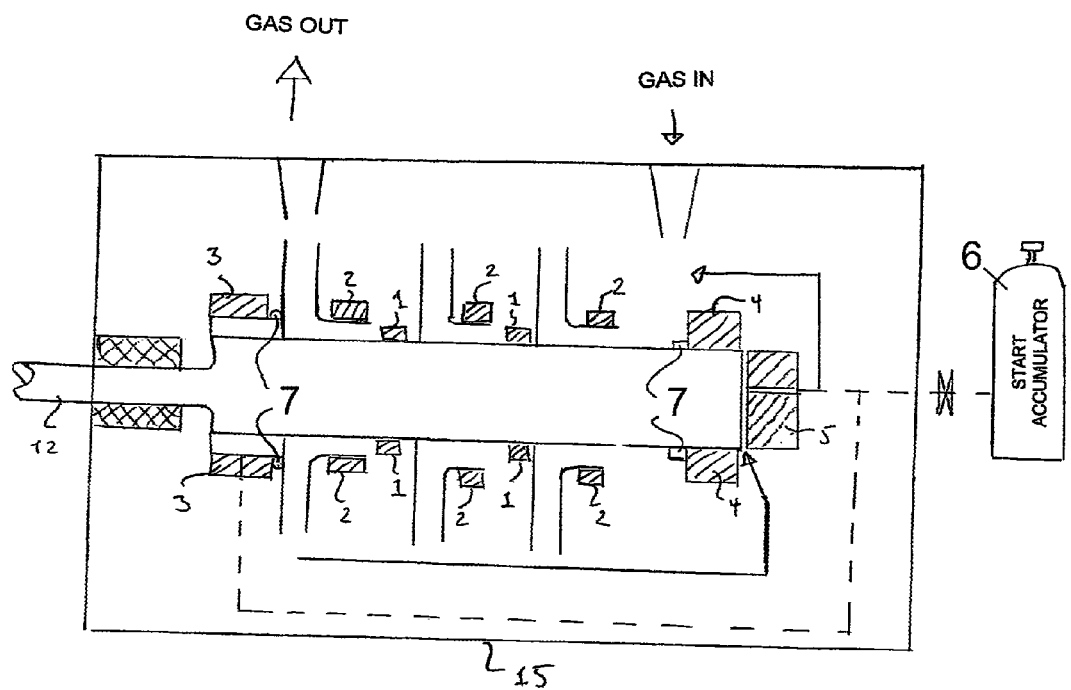
FIG. 3 shows schematically an embodiment with several of the components from FIG. 2 and a start-up/run-down accumulator.

With reference to FIG. 3, an embodiment is illustrated which is an example of the use of the present invention where the bearings/seals 3, 4, 5 are of the type referred to above in connection with FIG. 2. In this case, internal seals 1, 2 are also arranged between each impeller. The latter can be configured as a converging clearance or other suitable geometry so as to improve the rotor-dynamic properties if found expedient. The internal seals may alternatively only have a function as seals having conventional design.

It is clear, furthermore, that the combined seals and bearings require a pressure difference in order to cause the required rigidity and damping. This is a fact that must be taken into account during start-up and shut-down. As shown in FIG. 3, the difference in pressure can be obtained by means of an accumulator 6 which is put in communication with the respective bearing and seal combinations 3, 4, 5 in any suitable way. The accumulator is filled with gas pressurised to the outlet pressure P2 for injection into the bearing and seal combinations 3, 4, 5. An alternative is the mounting of special start-up and run-down bearings 7 which also additionally are shown in FIG. 3, for example, bearings of the same type as used in magnetic bearings, and which withstand contact for a brief period during start-up or run-down.

The concept according to the invention can be implemented in a hermetic compressor, where the motor is placed in a pressurised gas atmosphere, or in a conventional, externally powered rotating machine. In the latter case, a designated shaft or axle seal 8 must then be used to seal against the atmosphere. However, such a seal may be made substantially smaller than normal, as the shaft diameter shall only be dimensioned for transfer of necessary torque. The benefit of the reduced shaft diameter is that the area of use of high-pressure compressors is extended as a consequence of the fact that smaller seals withstand greater pressure. Expressed briefly, technical limitations on allowed seal pressure depend on seal diameter. Since when using the present invention there is no need for a separate support bearing outside the seal, the diameter can be made substantially smaller than in a conventional rotating machine.

Figure 4:
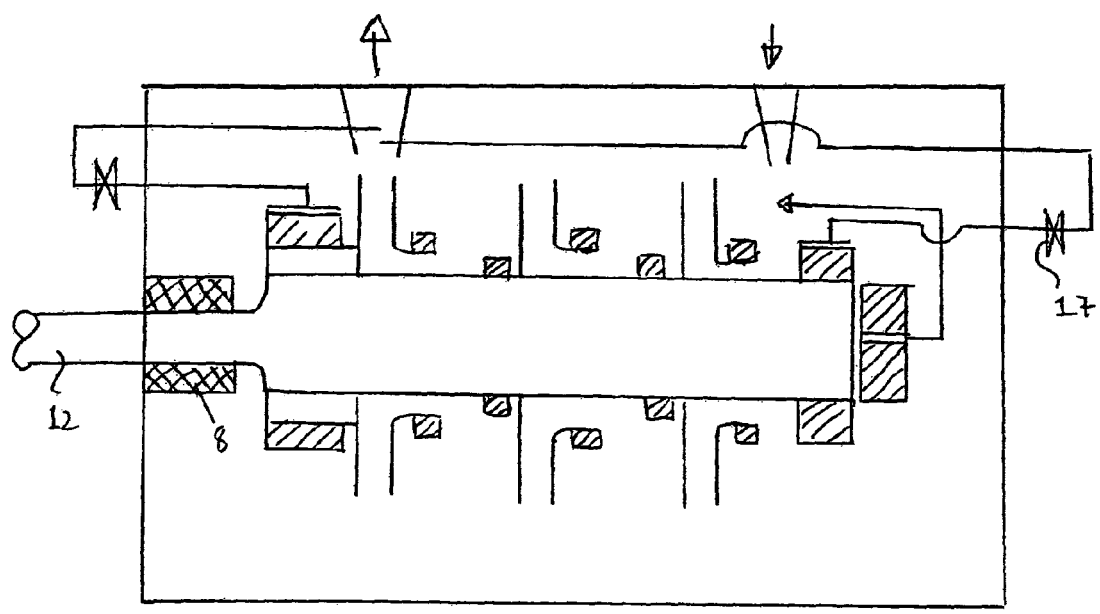
FIG. 4 shows further schematic another embodiment with the possibility of altering the clearance geometry of the bearing system, respectively internal pressure differences in the rotating machine.

Moreover, as shown in FIG. 4, it is possible in addition to envisage an adjustment of the geometry of the combined bearings and seals by using gas pressure differences in the rotating machine and lead the necessary bores out to a control means, for example, a regulating valve 17 which alters the pressure in a cavity between the stator and the compressor housing, or in the stator, in such manner that the pressure forces change the geometry of the bearing and seal clearance. With such a variant, it is possible to obtain a necessary degree of freedom in order to cater for different operating conditions by changing rigidity and damping in the combined bearings and seals.

Figure 5:
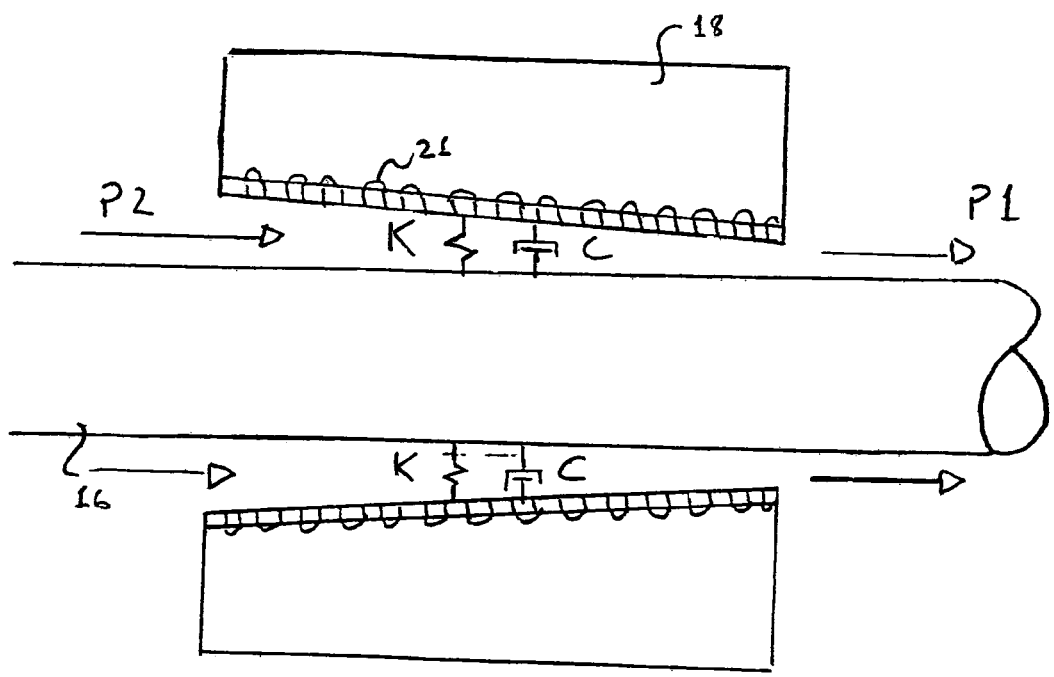
FIG. 5 shows schematically the same as FIG. 2, but in this case formed with two sets of radial hole-patterns for increased damping in the bearing system by means of gas exchange.

As shown in FIG. 5, the damping can be further increased with the aid of the alternative configuration of the surface of the stator 18 facing the rotor 16. In this case, the bore 19 in the stator 18 has a surface structure 21 consisting of an external radial hole-pattern and a corresponding internal hole-pattern, but so positioned relative to each other that a gas exchange can take place in the direction of the greater pressure P2.

Figure 6:
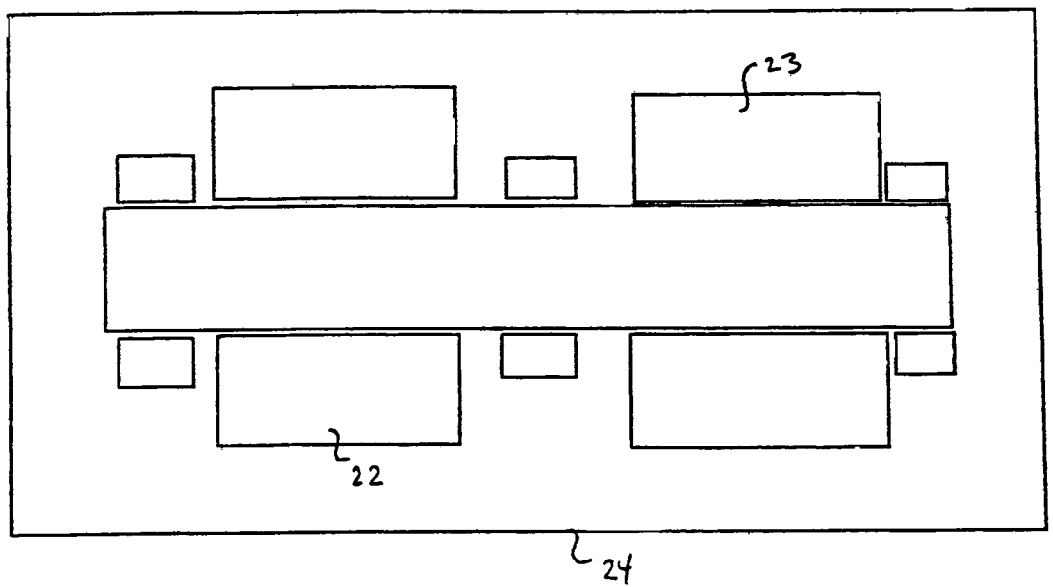
FIG. 6 shows schematically an embodiment of the invention with compressor and motor located in the same housing.

As shown schematically in FIG. 6, the motor 22 and the compressor 23 can also be located in the same housing 24. This means that external sealing is advantageously not required.

Also, it should be noted that a passive permanent magnetic bearing, see FIG. 2, can be used to support the rotor. This will reduce the load on the fluid film and increase the overall rigidity of the bearing, which is essential at start-up or shut-down. In such a case, the passive permanent magnetic bearing is arranged integrated in the bearing and seal combination or separately next to the combination.

Figure 7A:
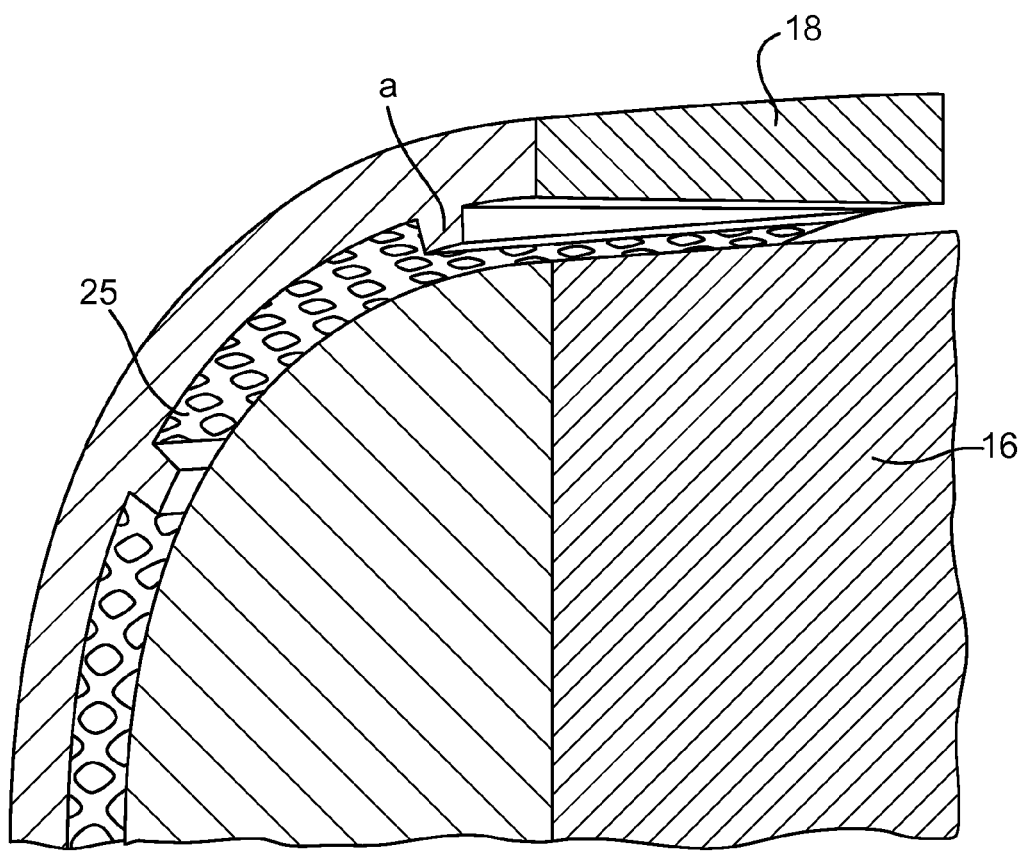
FIGS. 7A to 7D shows schematically another embodiment of a stator provided with among others guide blades in perspective and section view, respectively, and seen projected into a horizontal plane.
Figure 7B:
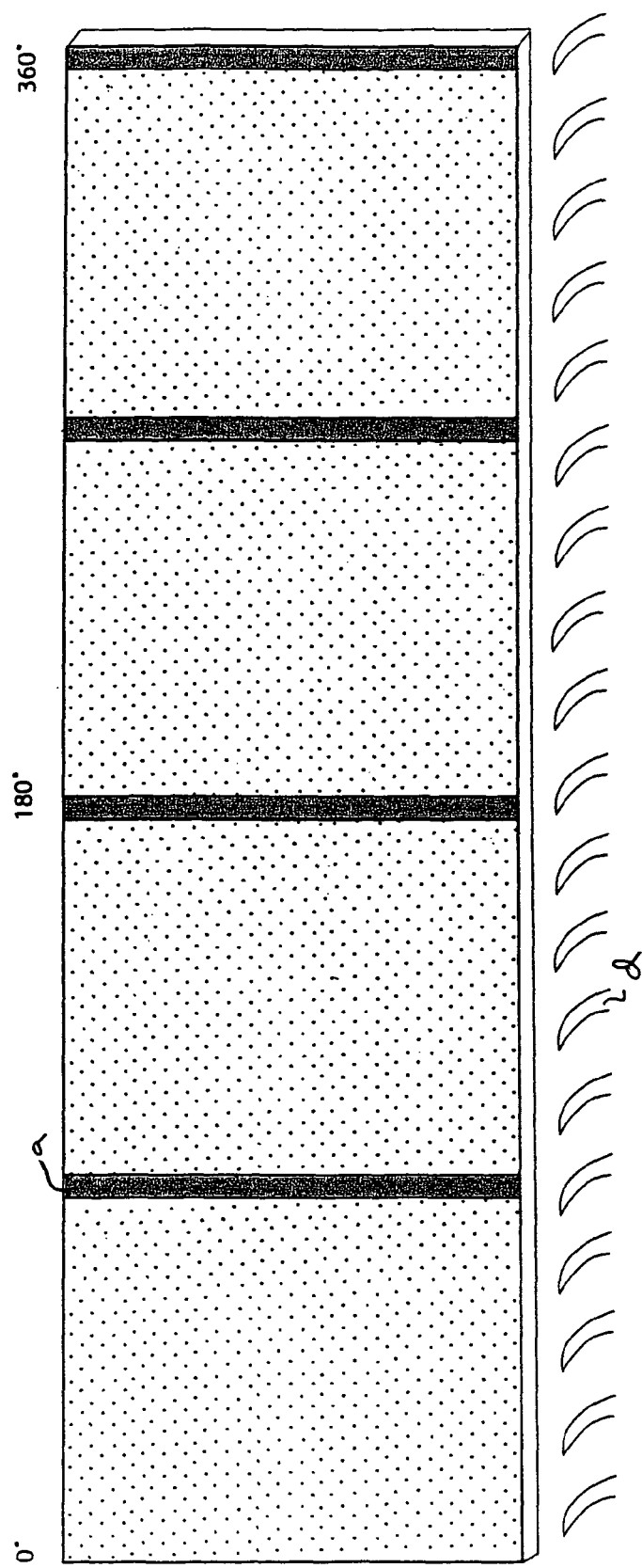
Figure 7C:
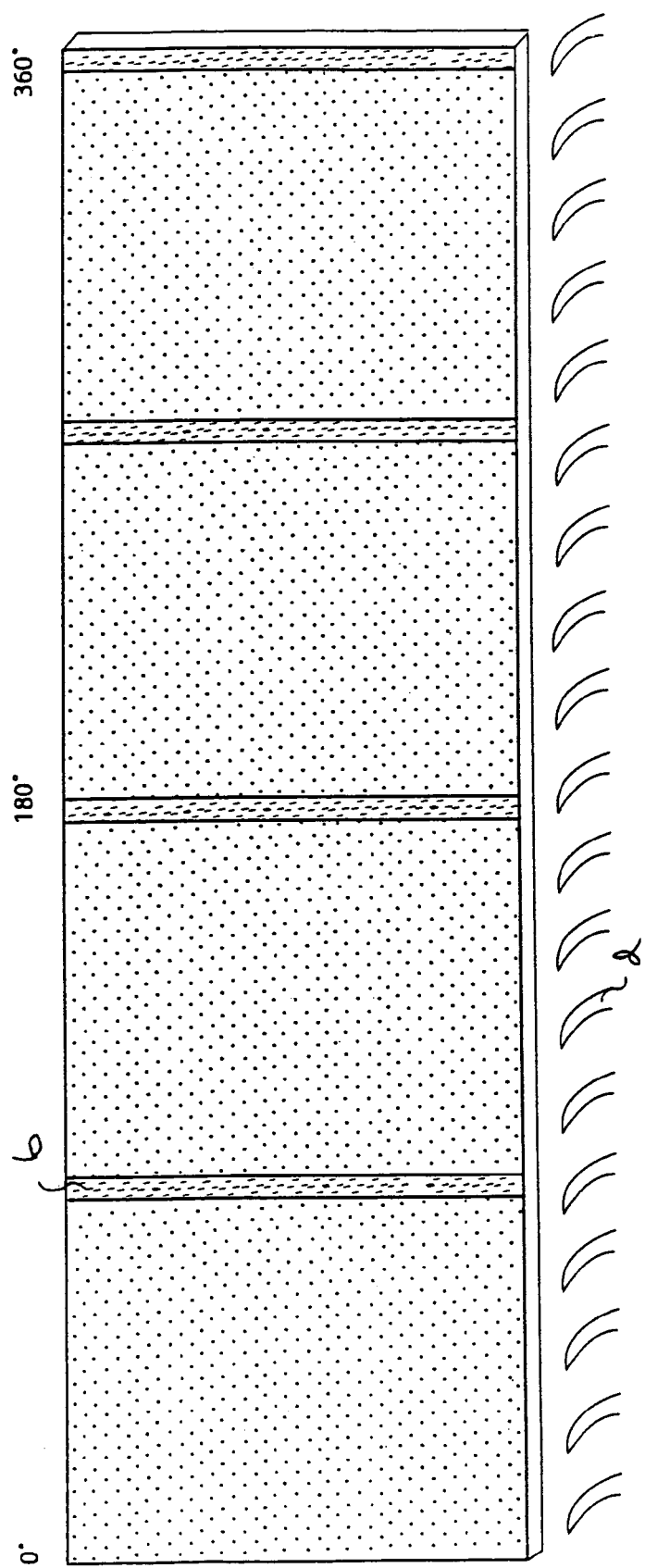
Figure 7D:
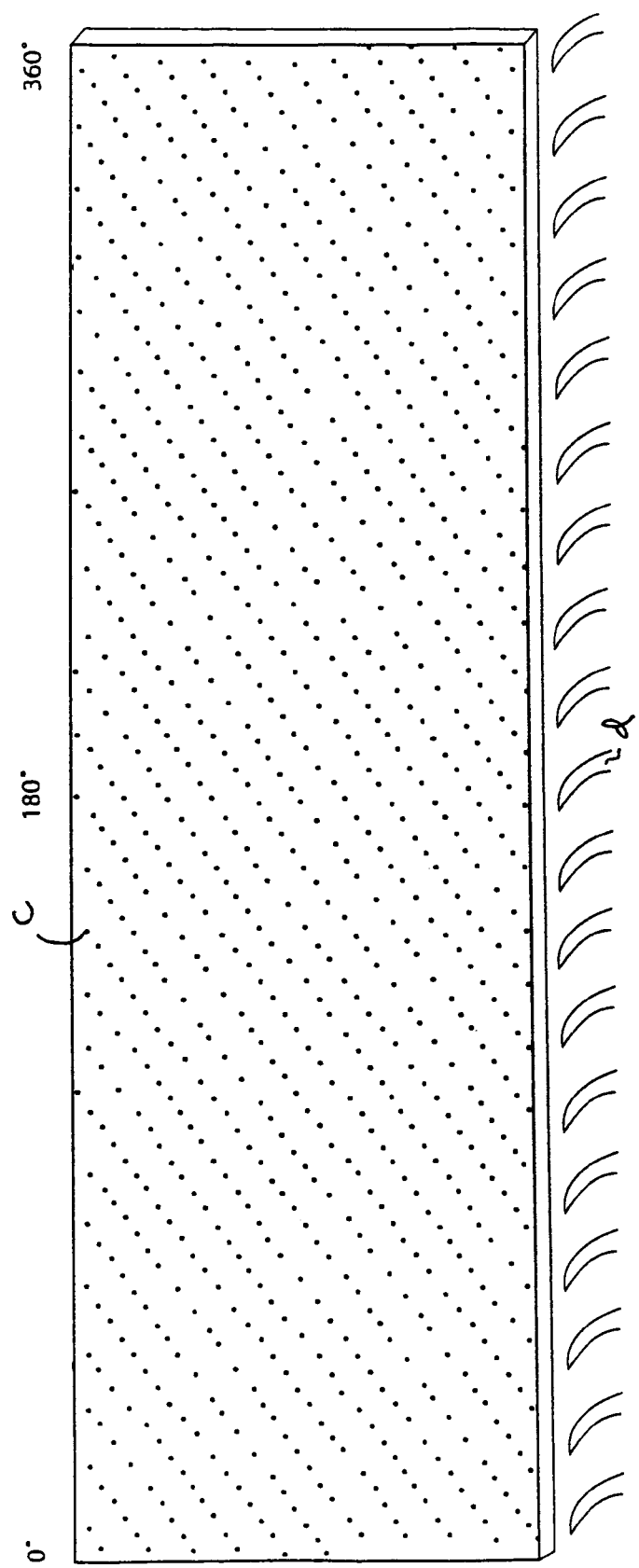

Now, reference is made to FIG. 7A to 7D for further explanation of advantageous embodiments of the invention having alternatives to reduce gas rotation. The alternatives may be seen isolated or in combinations with one another, and in the drawings it is illustrated with reference indicators that "a" specifies one example of an axial rib, "b" specifies one example of axial brush, "c" specifies one example of inclined hole-pattern, and "d" specifies one example of a guide apparatus, where the latter may be guide blades. Even if FIG. 7B to 7D all show such a guide blades, it should be understood that the guide blade may be separately used or in combination with one or more of the other variants. Otherwise, it shall particularly be noted that the variant according to FIG. 7A illustrates that in addition to the axial ribs it is arranged a separate honeycomb structure 25, which may possibly used along with the other mentioned above. The examples above and their respective uses will be explained below. In actual uses it is utilized a distance in the clearance of approximately 0.2-0.3 mm.

Longitudinal, axial ribs mean a raised portion in the surface which is situated in the longitudinal direction of the stator.

Brushes correspond partly to the longitudinal, axial ribs mentioned above, but in stead of being of "solid wood" these are made from brushes having minimal radial threads.

Configuration of the hole-pattern is small holes in the surface situated in a pattern which is inclined to the axial direction, whereby the flow restriction of gas is directionally orientated. As an example, inclined is here meant relative to the axial direction of the stator.

In one variant of the invention the stator is formed in a manner that the gas rotation in the clearance providing for sealing and bearing is minimal, to achieve sufficiently effective damping at low frequencies. For instance, this may be achieved having longitudinal, axial ribs, brushes or by forming a hole-pattern, whereby the gas slows more easily to the rotating direction of the shaft. Similarly, one or more segmented annuluses may be situated in the stator, with or without injection/extraction of gas to achieve the same effect.

Gas from an accumulator can be injected, for instance, into one or more apertures in a lower half of the bearing and sealing rings. The dimension of the apertures is advantageously adapted to the geometry of the clearance and the weight of the rotor according to a hydrostatic bearing principle.

By one configuration it is confirmed that for some applications, prior art a pattern to achieve roughness in the stator, such as hole-pattern, honeycomb structure, etc., will not provide for sufficiently effective damping at low excitation frequencies. In such cases, it is found advantageously to alter the roughness pattern, whereby they are formed having longitudinal ribs or brushes and the like to reduce the rotation of the gas film and thereby the cross coupling stiffness of the gas film.

In addition or as an alternative to the latter, the pattern in the stator can be formed in a manner that the flow resistance is higher in the direction of the rotating direction, e.g. at an inclined hole-pattern. Thereby, the rotation f the gas will be reduced relatively to the prior art.

As a further addition or alternative, it may be arranged a guide apparatus at the inlet to the stator 18 of the bearing and sealing unit, which gives the gas a start rotation in a direction opposite the rotating direction of the rotor 16.

These embodiments involve that the stator is formed in a manner that the gas rotation within the sealing and bearing clearance is minimal, to achieve sufficiently effective damping at low frequencies. As mentioned above, this may be achieved generally and as examples having longitudinal ribs, brushes or by forming a hole-pattern, whereby the gas flows more easily to the rotating direction. Similarly, one or more segmented annuluses may be situated in the stator, with or without injection/extraction of gas to achieve the same effect.

As to achieve benefit at all driving phases, the invention is adapted in a manner that gas from the accumulator can be injected into one or more apertures in the lower half of the bearing and sealing rings. The dimension of the apertures is then advantageously adapted to the geometry of the clearance and the weight of the rotor according to a hydrostatic bearing principle.

The invention claimed is:

1. A bearing system for a rotor in rotating machines, comprising at least two bearings and associated seals being provided for the rotor, wherein each of the bearings and sealing points for the rotor are in the form of a bearing and seal combination which is formed of a stator located within a rotating machine housing and surrounding the rotor, wherein the stator is formed with a bore, whereby an annular clearance is formed between the stator and rotor, and wherein the bore has a gradually increasing sectional area in a direction of higher pressure (P2) within the rotating machine, wherein the stator is provided with at least one of an axial rib, a brush or guide blades adapted for damping of gas rotation in the annular clearance.

2. A bearing system according to claim 1, wherein the bearing and seal combination is an axial bearing formed as a cylindrical disc on the rotor which bears against an associated portion of the stator, whereby a gas film may be formed with rigidity and damping.

3. A bearing system according to claim 2, wherein the axial bearing is formed according to the hydrostatic principle which entails a flow restriction before and after its bearing surface as to obtain rigidity with accompanying damping.

4. A bearing system according to claim 2 wherein the axial bearing is formed as a combination of a radial bearing with gas film and the hydrostatic principle with flow restriction before and after its bearing surface.

5. A bearing system according to claim 1, wherein the bore is formed having an uneven surface structure.

6. A bearing system according to claim 1, wherein the bore is formed having a honeycomb structure or pattern of holes.

7. A bearing system according to claim 1, wherein a surface structure of the bore has an outer zone consisting of an external radial pattern of holes and an internal pattern of channels, but so positioned relative to each other as to allow gas exchange to take place in the direction of the higher pressure (P2).

8. A bearing system according to claim 1, wherein at a start-up or a run-down of the rotating machine a higher pressure (P2) is provided by means of an accumulator which contains gas at such a pressure, and which is in communication with each individual one of the bearing and seal combination.

9. A bearing system according to claim 1, wherein the system comprises at least two support bearings arranged in connection with the respective bearing and seal combination, and which are of a type suitable for withstanding contact for a brief period during start-up or run-down.

10. A bearing system according to claim 1, wherein the system includes a control means so as to adjust the geometry of the respective bearing and seal combination by means of applied pressure forces.

11. A bearing system according to claim 10, wherein the control means is a regulating valve.

12. A bearing system according to claim 1, wherein a passive permanent magnetic bearing is provided to support of the rotor at start-up or shut-down.

13. A bearing system according to claim 12, wherein the passive permanent magnetic bearing is arranged integrated in the bearing and seal combination.

14. A bearing system according to claim 1, wherein the guide blades give the gas a start rotation in a direction opposite a rotating direction of the rotor.

15. A bearing system according to claim 1, wherein the rotating machine is chosen among at least one of the following: a compressor, a pump, a turbine, an expander.

* * * * *